April 5, 1927.
C. E. POSTLETHWAIT
1,623,493
ADJUSTABLE STEERING POST
Filed Dec. 28, 1926
2 Sheets-Sheet 1
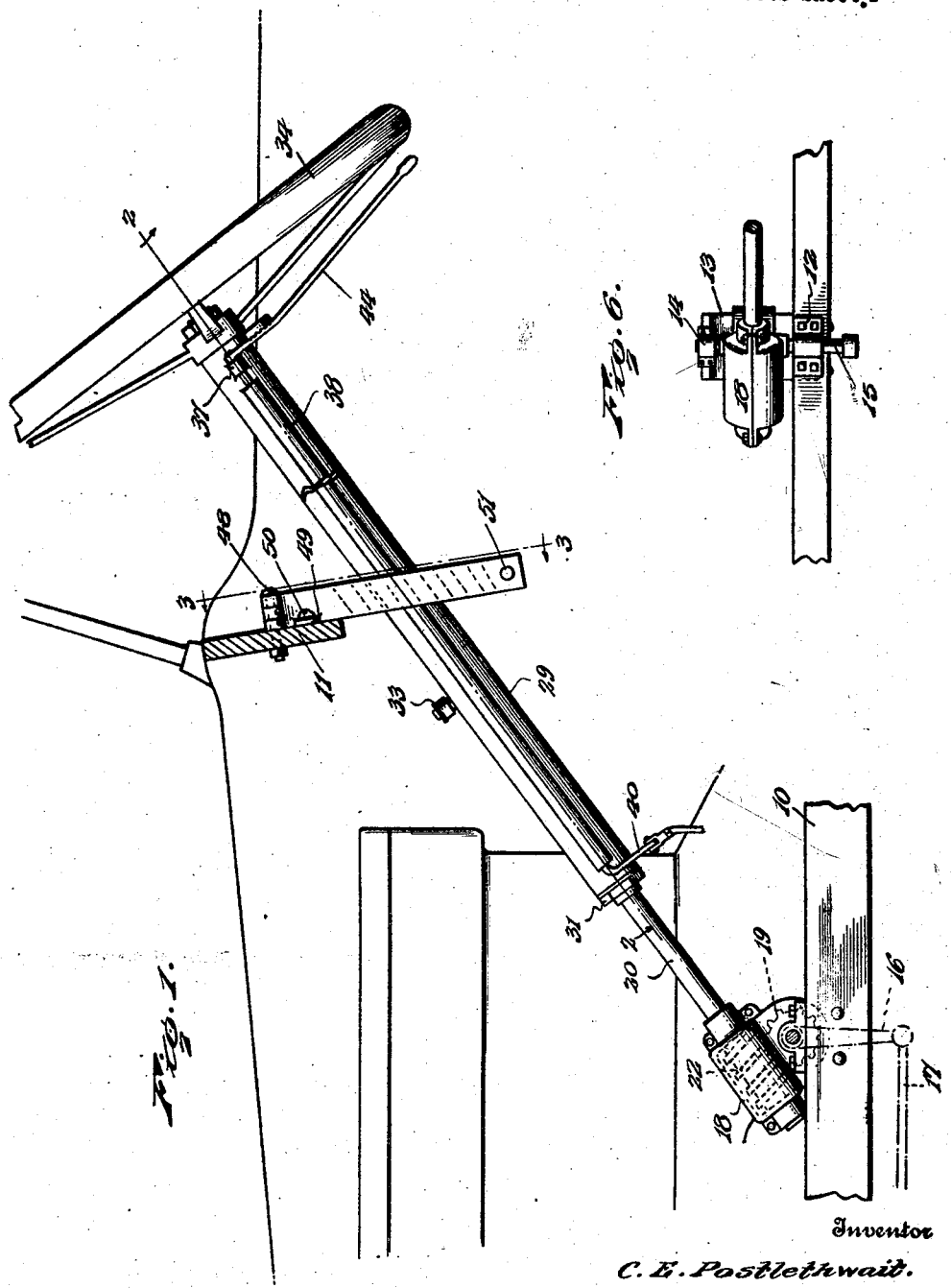
Inventor
C. E. Postlethwait.
By Lacey & Lacey, Attorneys

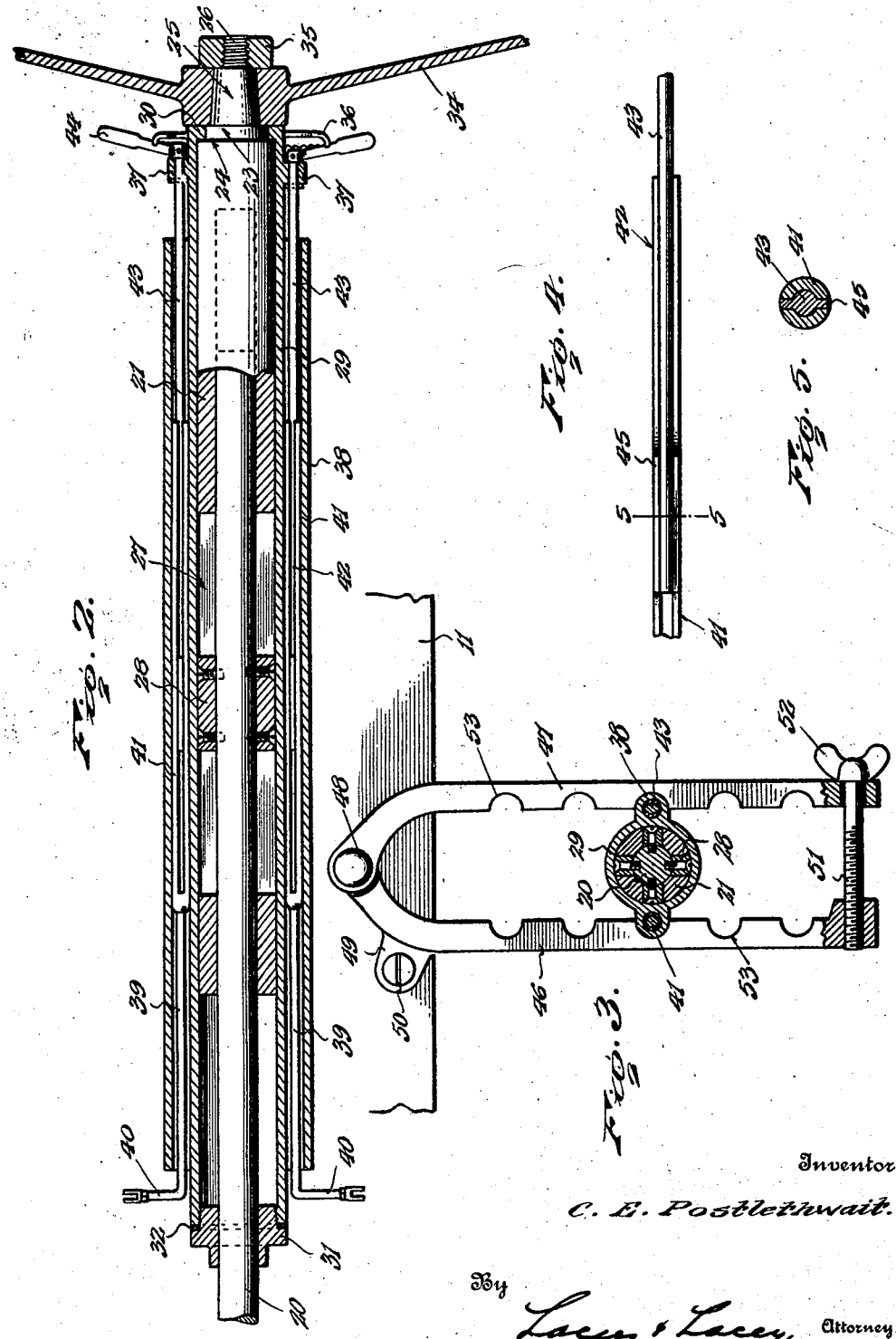

Patented Apr. 5, 1927.

1,623,493

UNITED STATES PATENT OFFICE.

COLUMBUS E. POSTLETHWAIT, OF WALLACE, WEST VIRGINIA.

ADJUSTABLE STEERING POST.

Application filed December 28, 1926. Serial No. 157,589.

This invention relates to an improved steering post for motor vehicles and seeks, among other objects, to provide a post which may be either lengthened or shortened for elevating or lowering the steering wheel to suit the convenience of the driver.

A further object of the invention is to provide a steering post which may be rocked forwardly or rearwardly for adjusting the angular position of the steering wheel with respect to the driver's seat to suit the convenience of the driver.

And the invention seeks, as a still further object, to provide a single means for locking the steering post in adjusted position.

Other objects of the invention not specifically mentioned in the foregoing will appear during the course of the following description.

In the accompanying drawings:

Figure 1 is a side elevation showing my improved steering post applied, parts of a conventional motor vehicle being illustrated.

Figure 2 is a sectional view on the line 2—2 of Figure 1, looking in the direction indicated by the arrows.

Figure 3 is a sectional view on the line 3—3 of Figure 1, looking in the direction indicated by the arrows.

Figure 4 is a detail plan view particularly showing the telescopic sections of one of the control rods.

Figure 5 is a transverse sectional view on the line 5—5 of Figure 4.

Figure 6 is a fragmentary plan view showing the mounting of the steering worm housing.

Referring now more particularly to the drawings, I have shown the left frame bar of the chassis of a conventional motor vehicle at 10, while the instrument board of the vehicle is indicated at 11. Mounted upon the frame bar 10 is a bearing 12 and appropriately secured to said bar is a bracket 13 at the free end of which is a bearing 14 alining with the bearing 12. Journaled through said bearings is a rock shaft 15, and fixed to the outer end of said shaft is a lever 16 to which is connected the usual drag link 17 of the steering gear. Journaled upon the shaft 15 between the bearings 12 and 14 is a gear housing 18, and fixed to the shaft within the housing is a worm gear 19.

As most clearly shown in Figure 2, the steering post comprises a lower solid shaft section 20 and an upper tubular shaft section 21 which telescopically fits over the lower section. The lower section 20 is journaled through the housing 18, and fixed to said section is a worm 22 meshing with the worm gear 19 so that when the section 20 is rotated, the shaft 15 will be rocked for swinging the lever 16 and steering the vehicle. Near its upper end, the section 21 of the post is provided with a reduced circular portion 23 at the base of which is an annular shoulder 24, and rising from the portion 23 of the section is a conical terminal 25 from which projects an axial stud 26. The shaft section 20 is provided, as particularly seen in Figure 3, with quadrantly spaced longitudinally extending slots 27, and screwed or otherwise fixed to the section 20 are keys 28 slidably fitting in said slots. Thus, the section 21 may be shifted upwardly or downwardly upon the section 20 for lengthening or shortening the steering post while, when the section 21 is turned, the section 20 will be caused to turn therewith.

Snugly but removably fitting over the section 21 is a casing 29 provided at its upper end with a flange 30 which freely surrounds the circular portion 23 of the shaft section 21 and rests on the shoulder 24. Closing the casing at its lower end is a nut 31 which snugly surrounds the shaft section 20 and, preferably, a gasket 32 is employed to provide an oil-tight joint between the nut and casing. Thus, grease may be introduced into the casing for lubricating the parts, and mounted upon the casing, as seen in Figure 1, is an appropriate oil or grease cup 33. Fitting the tapered terminal 25 of the shaft section 21 is a steering wheel 34 keyed to said terminal, and screwed on the stud 26 is a nut 35 securing the steering wheel in position. Thus, as will be understood in view of the foregoing, the steering post may be lengthened or shortened by pulling upwardly or pushing downwardly on the steering wheel, and attention is now directed to the fact that the flange 30 of the casing 29 is confined between the shoulder 24 of the shaft section 21 and the hub of the steering wheel so that when the shaft section 21 is moved upwardly or downwardly the casing will be shifted therewith.

Formed on the casing 29 near its upper end is a toothed segment 36 below which the casing is provided with diametrically disposed lateral ears 37, and alining with said ears are longitudinally extending tubular bosses 38 integral with the casing. As shown in Figure 2, the bosses 38 extend throughout the major portion of the length of the casing and are open at their ends. Journaled in the bosses are lower control rod sections 39 which are provided at their lower ends with levers 40. These rod sections are formed with tubular upper end portions 41 in which are provided diametric longitudinally extending slots 42, and slidably fitting at their lower ends in the tubular portions 41 of the lower rod sections are the upper sections 43 of the control rods. The sections 43 are journaled through the ears 37, and detachably fixed to the upper ends of said sections are levers 44 which are disposed to coact with the segment 36, while at their lower ends said sections are, as particularly seen in Figures 4 and 5, formed with keys 45 slidably fitting in the slots 42. The rods are, of course, provided for controlling the spark and throttle of the vehicle engine, suitable connections being made with the levers 40 for accomplishing these functions and, as will be seen, when the levers 44 of said rods are swung, the rods will be rotated while, when the steering post is lengthened or shortened in the manner previously described, the upper rod sections 43 will slide within the tubular portions 41 of the lower rod sections 39.

Mounted upon the instrument board 11 of the vehicle, as seen in Figure 3, is a bracket which includes a pair of companion jaws 46 and 47, and extending through the upper ends of said jaws is a bolt 48 which not only serves to pivotally connect the jaws but also extends through the instrument board 11 for securing the jaws thereto. Formed on the jaw 46 near its upper end is an ear 49, and extending through said ear and through the instrument board is a bolt 50 securing the jaw in fixed position. However, the jaw 47 may freely swing with respect to the jaw 46, and extending through the jaws near their lower ends is a clamping bolt 51 preferably equipped with a wing nut 52. As brought out in Figure 1, the jaws extend downwardly from the instrument board to straddle the casing 29 of the steering post, and formed in the inner longitudinal edges of said jaws are pairs of oppositely disposed notches 53 which are adapted to selectively receive the bosses 38 on said casing. Thus, by adjusting the nut 52 of the bolt 51, the casing may be rigidly clamped between the jaws for supporting the steering post near its upper end, and attention is now directed to the fact that by releasing the jaws from in engagement with the bosses 38, the steering post may be rocked forwardly about the shaft 15 or may be rocked rearwardly for adjusting the steering wheel 34 in angular relation to the driver's seat, when the jaws 46 and 47 may again be clamped in engagement with said bosses for securing the steering post in adjusted position. Furthermore, these jaws will, as will be perceived, also serve to lock the casing and consequently the shaft section 21 in adjusted position longitudinally of the shaft section 20. I accordingly provide a steering post which may be either lengthened or shortened as well as tilted forwardly or rearwardly and wherein but a single locking means is employed for securing the post in adjusted position.

Having thus described the invention, what I claim is:

1. A steering post including a lineally adjustable shaft, means mounting said shaft for forward or rearward tilting adjustment, and a single means locking the shaft in lineally adjusted position as well as in tilted adjusted position.

2. A steering post including a lineally adjustable shaft, means mounting said shaft for forward or rearward tilting adjustment, and a bracket supporting the upper end portion of the shaft and locking the shaft in lineally adjusted position as well as in tilted adjusted position.

3. A steering post including a lineally adjustable shaft, means mounting said shaft for forward or rearward tilting adjustment, a casing carried by and enclosing a portion of said shaft, and a bracket straddling the casing and coacting therewith for locking the shaft in lineally adjusted position as well as in tilted adjusted position.

4. A steering post including a shaft formed of telescopic sections one adjustable longitudinally relative to the other, means mounting said shaft for forward or rearward tilting adjustment, and a single means locking the shaft in tilted adjusted position as well as locking said adjustable shaft section in adjusted position.

5. A steering post including a shaft formed of telescopic sections one adjustable longitudinally relative to the other, means mounting the shaft for forward or rearward tilting adjustment, a casing carried by said adjustable shaft section, a fixed bracket having swingingly connected jaws straddling the casing, and means clamping the jaws in engagement with the casing for locking said shaft in tilted adjusted position as well as locking the adjustable shaft section in adjusted position.

6. A steering post including a rock shaft, a gear housing journaled thereon, a steering post shaft formed of telescopic sections one journaled in said housing and the other adjustable longitudinally with respect to the former section, the housing supporting the steering post shaft for forward or rearward tilting adjustment about said rock shaft, a casing carried by said adjustable steering post shaft section and provided with bosses, and a bracket straddling the casing to coact with said bosses for locking the steering post shaft in tilted adjusted position as well as locking the adjustable steering post shaft section in adjusted position.

In testimony whereof I affix my signature.

COLUMBUS E. POSTLETHWAIT.